Figure 1:
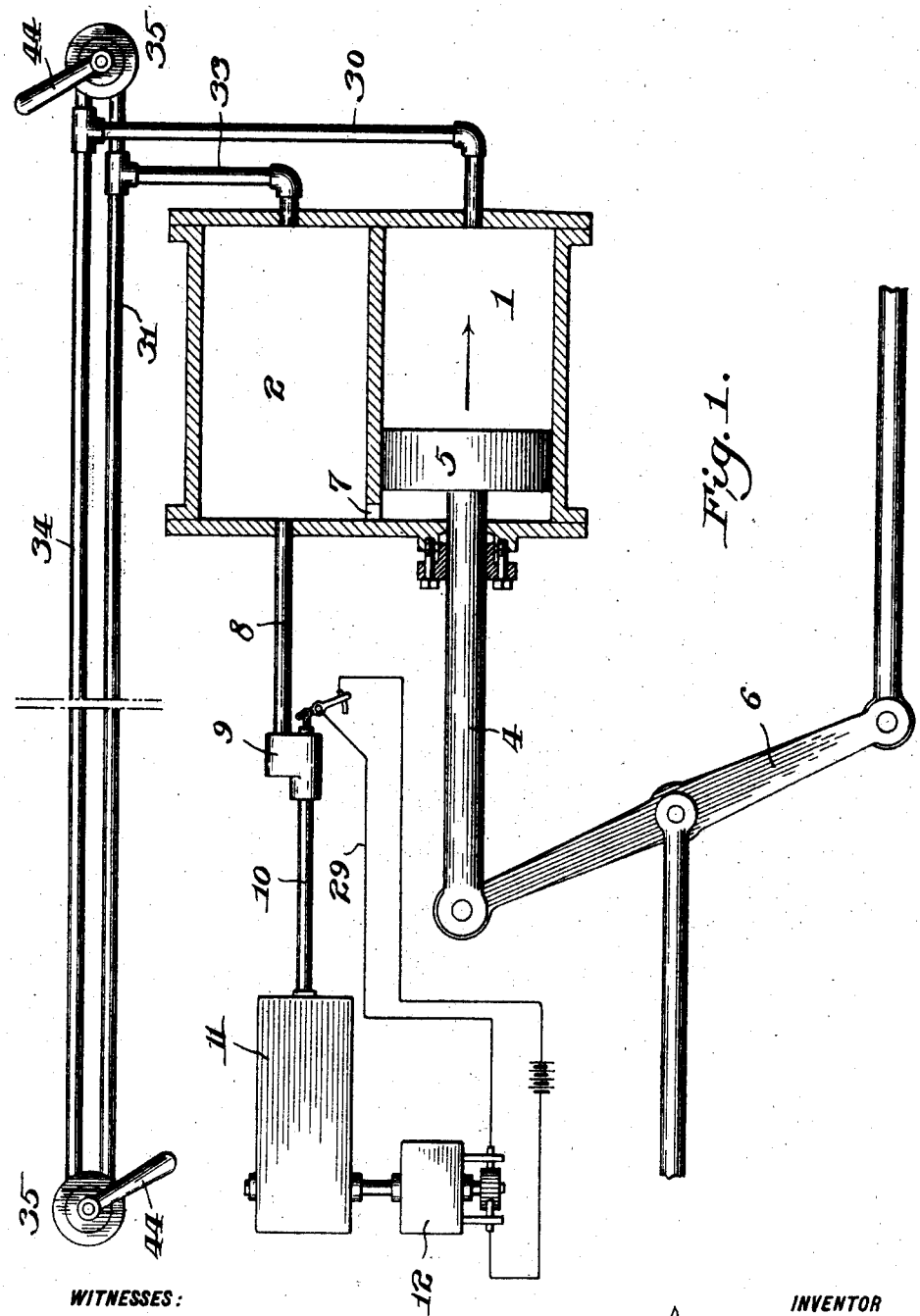

A. J. WISNER.
AIR BRAKE.
APPLICATION FILED OCT. 18, 1907.

927,016.

Patented July 6, 1909.
3 SHEETS—SHEET 1.

WITNESSES:

INVENTOR
Andrew J. Wisner
BY
ATTORNEY.

A. J. WISNER.
AIR BRAKE.
APPLICATION FILED OCT. 18, 1907.
927,016.
Patented July 6, 1909.
3 SHEETS—SHEET 2.
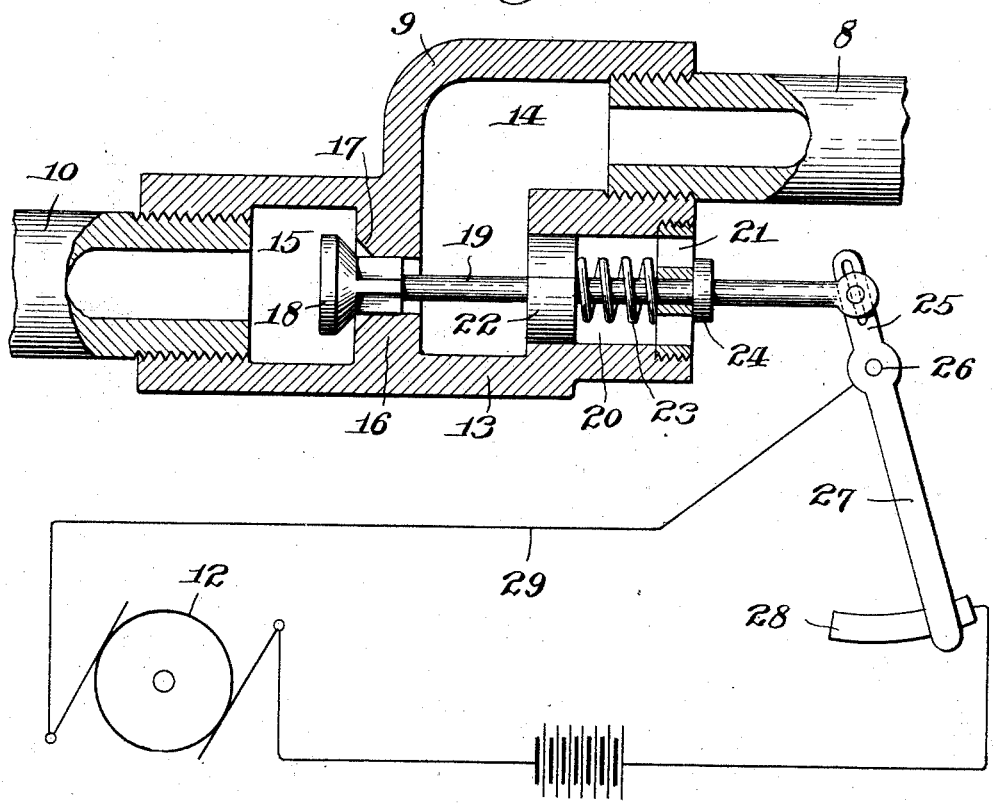

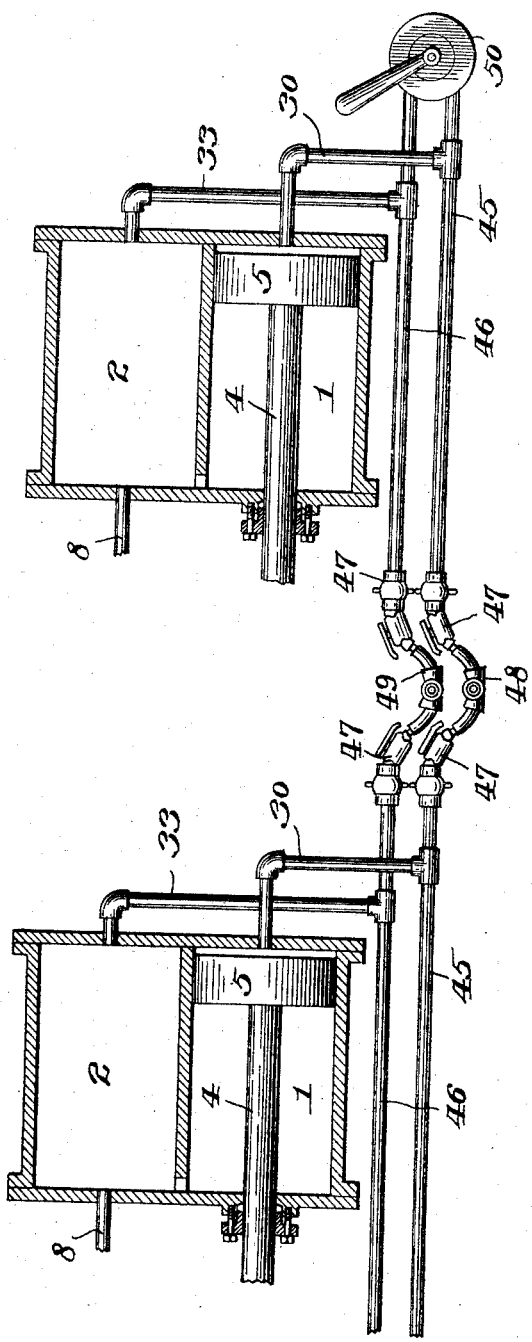

UNITED STATES PATENT OFFICE.

ANDREW J. WISNER, OF PHILADELPHIA, PENNSYLVANIA.

AIR-BRAKE.

No. 927,016.  Specification of Letters Patent.  Patented July 6, 1909.

Application filed October 18, 1907. Serial No. 398,042.

*To all whom it may concern:*

Be it known that I, ANDREW J. WISNER, citizen of the United States, residing at Philadelphia, in the county of Philadelphia and State of Pennsylvania, have invented certain new and useful Improvements in Air-Brakes, of which the following is a specification.

This invention relates to air brakes and has for its object to provide a simple and efficient construction and organization of parts whereby the brakes may be applied or released, as occasion may require, by the air pressure of an air-reservoir, and whereby such air-reservoir may be automatically supplied with air as the pressure therein is decreased during the application or release of the brakes.

With this object in view, the invention consists in the novel construction and combinations of parts which will be hereinafter fully described and claimed.

In the drawings:—Figure 1 is a sectional plan of my improved air brake. Fig. 2 is a vertical section through one of the controlling valves. Fig. 3 is a horizontal section, as on the line 3—3 of Fig. 2. Fig. 4 is a sectional plan of the automatic valve for controlling the inlet passage to the air reservoir, and adjuncts. Fig. 5 is a sectional plan showing how the air brakes of several cars may be connected to be operated by a single controlling valve.

The air brake forming the subject of my invention is adapted for use in connection with a single car or with a number of cars coupled together and forming a train. When a number of cars are coupled together to form a train, the brakes thereof are coupled together in a manner to be simultaneously operated by a single controlling valve, and when a single car is employed its brakes may be operated by a single valve at either end thereof, as will be hereinafter explained.

Referring now to the drawings, each car is provided with a brake cylinder 1 and an air reservoir 2. The rod 4 of the brake piston 5 extends through the rearward head of the brake cylinder and is connected with the brake actuating devices 6 in the usual manner. The application of the brakes is effected by the air pressure of the cylinder 2 forcing the piston 5 forwardly, as indicated by the arrow in Fig. 1, and the release of the brakes is effected by forcing the piston 5 rearwardly by the air pressure of the cylinder 2.

The air reservoir 2 communicates with the rearward end of the brake cylinder 1 by an opening 7, and opening into the air reservoir 2 is a pipe 8 leading from a valve 9 which is connected by a pipe 10 with a suitable air pump 11 by means of which air is supplied to the reservoir 2 through the pipes 8 and 10 and valve 9. The pump 11 is adapted to be actuated by a suitable electric motor 12. The pump 11 and motor 12 are mounted on the car body and may be of any approved type.

The valve 9 comprises a body portion 13 having formed therein two chambers 14 and 15 which communicate with the pipes 8 and 10, respectively. The chambers 14 and 15 are separated by a partition wall 16 in which is formed a valve seat 17 adapted to receive a valve head 18 on the inner end of a stem 19, which extends to and through a cylinder 20 which opens into the chamber 14. The valve stem 19 extends through and beyond a head 21 at the outer end of the cylinder 20 and it is provided with a piston 22 which is fitted to said cylinder. Encircling the stem 19 is a spring 23 which, bearing against the piston 22 and head 21, tends normally to maintain the valve open, as shown in Fig. 4, a collar 24 on the stem 19 coming in contact with the head 21 limiting the inward movement of the stem 19. The outer end of the stem 19 is connected to an arm 25 projecting from a rock shaft 26, and mounted on the shaft 26 and insulated therefrom is a contact arm 27 adapted to be moved into engagement with a contact plate 28, when the stem 19 is moved to open the valve, and adapted to be moved out of engagement with said plate when the stem 19 is moved to close the valve. The arm 27 and plate 28 form a switch for an electric circuit 29 in which the motor 12 is arranged, to the end that when the arm 27 is in engagement with the plate 28 the circuit will be closed, and the motor 12 and pump 11 actuated, and when the arm 27 is out of engagement with the plate 28, the circuit will be broken and the motor and pump remain idle. The pressure of the spring 23 is such that, when a predetermined air pressure, sufficient for braking purposes, has been introduced to the chamber 14 and perforce the reservoir 2, the piston 22 will be forced outwardly thereby, against the action of the spring 23, to move the head 18 into contact with the seat 17 and close the valve; and, at the same time, the arm 27 will be moved from engagement with the plate 28 to break the circuit 29 and stop the operation of the motor 12 and pump 11. When, however, the pressure in the reservoir 2 and chamber 14 falls below the predetermined braking pressure, the spring 23 will force the valve open and the arm 27 into engagement with the plate 28, thereby completing the electric circuit and starting the operation of the pump 11. Thus it will be seen that the pump 11 is automatically operated to maintain the predetermined braking pressure within the air reservoir 2.

Leading from the forward end of the brake cylinder 1 is a pipe 30 which is connected with a pipe 34 terminating at the respective ends of the car, and leading from the air reservoir 2 is a pipe 33 which is connected with a pipe 31 also terminating at the respective ends of the car and adjacent to the ends of the pipe 31. Located at each end of the car is a controlling valve 35 to which the ends of the pipes 31 and 34 are connected, each valve 35 being of the following construction:—36, Fig. 2, designates a hollow casing in which is seated a rotatable valve head 37. Extending through the casing 36 beneath the valve head 37 are three ports 38, 39, and 40, the pipe 31 being connected with the port 38, the pipe 34 being connected with the port 39, and the port 40 leading to the open air. The head 37 is provided with a passageway 41 which, when the valve is in one position, is adapted to afford communication between the ports 38 and 39 to connect the pipes 31 and 34, and, when the valve is turned to another position, to afford communication between the ports 39 and 40 to close the port 38 to disconnect the pipes 31 and 34 and to permit the air pressure in the pipe 34 and forward end of the brake cylinder to pass to the open air through the port 40. The valve head 37 is provided with a stem 12 which extends through a collar 43 screwed into the casing 36 and taking against the head 37 to hold it firmly against its seat. The upper end of the stem 12 is provided with a suitable handle 44 by means of which the head 37 may be turned. Either one of the valves 35 may be employed to control the operation of the brakes, the idle valve being turned to bring its passageway 41 out of register with any of the ports 38, 39, and 40, and thus close the adjacent ends of the pipes 31 and 34.

The operation of the brakes may be briefly described as follows:—As previously explained, the predetermined braking pressure is maintained in the reservoir 2 by the automatic action of the pump 11. It will be seen that when the parts occupy the position shown in the drawings, the reservoir 2 is in communication with the respective ends of the brake cylinder 1, and that the pressure being equal on both sides of the piston 5, the latter is maintained at the rearward end of the cylinder 1 due to the greater area of the forward face of the piston 5 owing to the rod 4. When the piston 5 is in this position, the brakes are released. When it is desired to apply the brakes, the valve 35 is turned to move the passageway 41 into register with the ports 39 and 40, thereby closing the port 38 and permitting the pressure in the forward end of the cylinder 1 to pass to the open air through the pipes 30 and 34 and port 40, and thus permit the pressure in the reservoir 2 to act upon the rearward face of the piston 5 to effect the application of the brakes. When it is desired to release the brakes, the valve is turned back to the original position to establish communication between both ends of the brake cylinder 1 and the reservoir 2, whereupon the air pressure moves the piston 5 to the rearward end of the cylinder 1 to release the brakes owing to the greater area of the forward face of the piston.

In order to provide for the operation of the brakes of each car simultaneously by a single controlling valve, when a number of cars are coupled together to form a train, I provide the construction shown in Fig. 5 which is as follows:—The pipe 30 leading from the brake cylinder 1 of each car is connected with a pipe 45 extending from end to end of the car, and the pipe 33 leading from the air reservoir 2 of each car is connected with a pipe 46 also extending from end to end of the car. The ends of the pipes 45 and 46 are provided with suitable valves 47 and the adjacent ends of the pipes 45 and the adjacent ends of the pipes 46 at the meeting ends of the cars are coupled together by flexible connections 48, 49 and the valves 47 are opened. Thus the pipes 45 and 46 of each car of the train form in effect two separate continuous pipes which are controlled by a valve 50 like the valves 35. Thus it will be seen that by operating the valve 50 to permit the discharge of air from the pipe 45 the brakes of each car will be simultaneously applied, and by operating the valve 50 to connect the pipe 45 with the pipe 46 the brakes will be simultaneously released.

I claim:—

1. In an air brake system, the combination of the brake cylinder, its piston, the air reservoir having communication with one end of the cylinder, means for establishing communication between the reservoir and the other end of the cylinder, means for establishing communication between the last named end of the cylinder and the open air, a pump connected with the reservoir to supply air thereto, a valve to control the passageway leading from the pump to the reservoir, a piston having one of its faces exposed to the pressure in the reservoir, connections between the last named piston and valve whereby the pressure in the reservoir may move the piston to close the valve, a spring acting against the last named piston in opposition to the pressure of the reservoir to open the valve when the pressure in the reservoir falls below a predetermined point, and means for automatically operating the pump when the valve is open and rendering the pump idle when the valve is closed, substantially as described.

2. In an air brake system, the combination of the brake cylinder, its piston, the air reservoir having communication with one end of the cylinder, means for establishing communication between the reservoir and the other end of the cylinder, means for establishing communication between the last named end of the cylinder and the open air, a pump connected with the reservoir to supply air thereto, a valve to control the passageway leading from the pump to the reservoir, a piston having one of its faces exposed to the pressure in the reservoir, connections between the last named piston and the valve whereby the pressure in the reservoir may move the piston to close the valve, a spring acting against the last named piston in opposition to the pressure of the reservoir to open the valve when the pressure in the reservoir falls below a predetermined point, an electric motor to operate the pump, an electric circuit to operate the motor, means for automatically opening the circuit when the valve is closed, and means for automatically closing the circuit when the valve is opened, substantially as described.

In testimony whereof I affix my signature in presence of two witnesses.

ANDREW J. WISNER.

Witnesses:
SADIE I. HARPER,
ELLA M. WARE.